United States Patent Office 2,912,317
Patented Nov. 10, 1959

2,912,317
GRANULAR FERTILIZER AND PROCESS OF PRODUCING SAME

Gunter H. Gloss, deceased, late of Mundelein, Ill., by Frithie Gloss, administrator, Downey, Ill., assignor to International Minerals & Chemical Corporation, a corporation of New York No Drawing. Application August 12, 1957
Serial No. 677,794

8 Claims. (Cl. 71—24)

This invention relates to a method of preparing a granular mixed fertilizer. More particularly, this invention relates to a method of preparing a granular fertilizer containing compounds of nitrogen, phosphorus, and potassium which are readily soluble in soil fluids.

Numerous processes have been developed for the preparation of fertilizer from phosphate rock. Generally, chemical and thermal methods have been used to convert the comparatively insoluble tricalcium phosphate constituent of phosphate rock into phosphate compounds which are readily soluble in the soil fluids. When phosphate rock is mixed with an additive material such as potassium sulfate and heated to fusion under reducing conditions, a substantial amount of the tricalcium phosphate present in the rock is converted to soluble phosphate compounds. However, when the solidified material is stored for an extended period, for example, about 1 month or longer, a substantial portion of the soluble phosphate compounds tend to revert back to insoluble phosphate compounds. As a result, the value of this material for use as a fertilizer is substantially reduced.

It is an object of the present invention to prepare a granular mixed fertilizer containing compounds of nitrogen, phosphorus, and potassium that are readily soluble in soil fluids.

Another object of this invention is to prepare a granular fertilizer from phosphate rock, nitric acid and a potassium sulfate-bearing material.

Still another object of the invention is to prepare a granular mixed fertilizer containing readily available phosphate compounds which can be stored for extended periods without substantial reversion of the soluble phosphate compounds to insoluble phosphate compounds.

These and other objects of the invention will become apparent from the detailed description which follows.

In accordance with this invention a granular mixed fertilizer is prepared by admixing phosphate rock, a carbonaceous material, and a potassium sulfate-bearing material, heating the mixture under reducing conditions to a temperature between about 750° C. and about 1000° C., cooling the reaction product mixture to form a solidified mass, comminuting the solidified mass, reacting the comminuted reaction product mixture with an aqueous nitric acid solution, granulating the reaction product and drying the granular fertilizer produced thereby.

More in detail, a phosphate rock concentrate which has been recovered from phosphate ore, such as the phosphate ore found in Florida and Tennessee, by conventional beneficiation operations is preferably used in the instant novel process. After mining of the ore, coarse particles are separated from the matrix by screening or other suitable sizing operation and heated to dryness. Material remaining after separation of coarse phosphate particles is subjected to an ore beneficiation operation to separate silica and other gangues and to produce a phosphate rock concentrate. The beneficiation operation may include flotation, hydroclassification, tabling, and spiralling steps, or various combinations of these steps. The particular beneficiation steps used will vary with the specific nature of the phosphate ore being treated. It is preferred to use a phosphate rock concentrate having a bone phosphate of lime (BPL) content in excess of about 65% by weight in order to produce a fertilizer having a high phosphate content.

Either coarse phosphate rock, which generally has a particle size greater than about 14 mesh, or fine phosphate rock concentrate may be used. If desired, phosphate ore without beneficiation, or phosphate rock concentrates having a BPL content less than about 65% by weight may be used in the preparation of the fertilizer, since the grade of the starting phosphatic material is not a critical factor in successfully preparing the fertilizer in accordance with the instant novel process.

A potassium sulfate-bearing material is used as a source of the potassium in the novel fertilizer. Suitable potassium sulfate-bearing materials include potassium sulfate, langbeinite, schoenite and polyhalite, or mixtures of these compounds. Compounds such as langbeinite, schoenite and polyhalite which contain sulfates of potassium and magnesium are preferably used in the process since the resulting fertilizer will then also contain magnesium, an additional plant nutrient. A potassium sulfate-bearing compound is used in an amount equivalent to between about 1 mole and about 3 moles and preferably between about 1.5 moles and about 2.5 moles of $K_2O$ per mole of $P_2O_5$ in the phosphate rock employed.

Carbonaceous materials utilized in this invention are carbon containing materials which are substantially non-volatile at temperatures of less than about 700° C., but which provide free carbon at temperatures attained during furnacing, i.e., a temperature above about 750° C. Materials which may be utilized include carbon black, asphalt, and other petroleum distillation residues, for example, Bunker C oil. In addition, carbon containing materials such as sugars, wheat flour, starch, sawdust, pitch, peat, lignin, and the like may be used. Also included within the term "carbonaceous material" is coal, graphite, carbon, bone black, lamp black, coal tar pitch, and similar materials. Carbonaceous materials containing little or no ash forming impurities are preferred, and petroleum coke is particularly preferred because it is substantially entirely free of ash forming impurities and has good handling properties. The carbonaceous material is employed in an amount of at least about 15% and preferably between about 20% and about 35% based on the weight of potassium sulfate-bearing compound utilized. However, larger quantities of carbonaceous material may be used if desired.

Phosphate rock, carbonaceous material, and a potassium sulfate-bearing compound are admixed in a suitable blending apparatus such as a pug mill or a muller to form a substantially homogeneous mixture. The mixture may be conveyed to a suitable furnace and heated as described more fully hereinafter. In a preferred embodiment of the invention, sufficient water is added to the mixture in the blending apparatus to provide between about 10% and about 30% by weight of water in the mixture. The mixture is introduced into a conventional rotating drum pelletizer to form pellets which are retained on about a 4 mesh screen. If desired, the moist mixture may be formed into pellets by any convenient pelletizing or extrusion process. Preferably, the pellets are formed at a pressure of between about 5000 p.s.i. and about 12,000 p.s.i., but greater or lesser pressure may be utilized if desired. It is only necessary to use that pressure which will produce pellets capable of being treated in a furnace at a temperature of between about 750° C. and about 1,000° C. without substantial disintegration. The size of the pellets may range from between about ¼" in diameter to over 1" in diameter. Any convenient size in this range is acceptable, and if desired, large pellets may be formed and then crushed to a smaller size before furnacing.

The mixture in pellet form is heated at a temperature between about 750° C. and about 1000° C. in any conventional reducing furnace. Preferably the reaction is carried out in a direct fired shaft furnace operated with a reducing flame. Generally, the furnace is operated at the lowest possible temperature which will produce substantial reduction of the potassium sulfate component of the mixture and preferably at a temperature between about 800° C. and about 950° C. At temperatures below about 725° C. no substantial reduction of the potassium sulfate component of the mixture takes place. At temperatures in excess of about 1000° C. there may be excessive volatilization of either or both the potassium and phosphorus components and therefore such temperatures are avoided. When the reduction process is carried out in a direct fired furnace, it is preferred to use a reducing flame with a quantity of air amounting to between about 75% and about 95% and preferably about 85% of that theoretically required for complete combustion of the combustible gases. A reducing flame increases the rate of the reduction reaction and the degree of reduction of the potassium sulfate to potassium sulfide. The reaction product mixture, which may be partially or completely fused, is discharged from the furnace on to a cold metal or stone surface to cause complete solidification of the reaction product mixture and is preferably cooled in a reducing atmosphere such as by passing dry natural gas across the surface of the solids. The natural gas absorbs heat from the solids, and the heated natural gas is then conducted to the burner of the direct fired furnace where it is utilized as a fuel. By using the preheated gas as fuel for firing the furnace substantially less than the quantity of air ordinarily used in burning the natural gas in the furnace can be used. In this instance, the combustion gases produced are substantially richer in hydrogen and carbon monoxide, and poorer in carbon dioxide and other vapors than when the gas is not so preheated. Thus, preheating the natural gas improves substantially the reducing characteristics of the reducing atmosphere in the furnace and thereby improves the efficiency of the furnace. Cooling the solid product in the presence of natural gas also prevents oxidation of the potassium sulfide.

The reaction product mixture contains magnesium oxide, potassium sulfide, dicalcium phosphate, potassium sulfate and other intermediate sulfur compounds. Since compounds of phosphorus in the reaction product mixture tend to revert to insoluble phosphorus compounds, the mixture should not be stored for an extended period, for example, not more than about one week prior to reaction with nitric acid as described more fully hereinafter.

After cooling the solid reaction product mixture, the solid is comminuted to form fine particles, for example, particles which are all substantially less than about 65 mesh. The comminuted solids are then mixed and reacted with an aqueous nitric acid solution in a suitable blending apparatus such as a pug mill. The pug mill or blending apparatus should be provided with suitable ventilating means in order to remove the oxides of nitrogen which are generated in the reaction.

Aqueous nitric acid solution preferably of between about 50% and about 75% nitric acid by weight is generally used, but stronger or weaker solutions may be used if desired. Nitric acid is added to the comminuted reaction product mixture in an amount equivalent to between about 2 moles and about 8 moles, and preferably between about 3 moles and about 6 moles of nitric acid per mole of $K_2SO_4$ in the mixture of phosphate rock, carbon, and potassium sulfate-bearing material charged to the furnace. When nitric acid is added to the reaction product mixture in these quantities there is sufficient nitric acid present to neutralize substantially all of the potassium sulfide and any magnesium oxide that may be present in the comminuted furnace product.

When an aqueous nitric acid solution is mixed with the reaction product mixture in the above mentioned amounts and concentrations there is sufficient aqueous medium present to form a semi-plastic mass when mixed with the solid reaction product mixture. The semi-plastic mass is then granulated in a suitable apparatus such as an inclined rotating drum and the resulting granular material is heated conventionally in a suitable furnace such as a rotating kiln to remove substantially all of the moisture present in the granules.

The invention will be further understood by reference to the following examples which are given by way of illustration and without any intention that the invention be limited thereto. All parts and percentages are by weight unless otherwise specified.

*Example 1*

Florida phosphate ore was mined, deslimed, sized, and beneficiated by conventional froth flotation methods to recover a phosphate rock concentrate having a BPL content of about 72% by weight (about 32.8% $P_2O_5$ by weight). The concentrate was dried and comminuted. An approximate screen analysis of comminuted phosphate rock concentrate on a dry basis is as follows:

| Screen analysis: | Percent |
| --- | --- |
| +80 mesh | 14.0 |
| −80 +100 | 8.0 |
| −100 | 78.0 |

About 25 parts of this phosphate rock concentrate, about 58.5 parts of langbeinite and about 20 parts of uncalcined petroleum coke were blended to produce a substantially homogeneous mixture. The mixture was placed in a porcelain crucible which was covered and placed in a natural gas fired furnace utilizing a burner to which was fed about 85% of the theoretical amount of air necessary for complete combustion of the gas. The mixture was heated for about 30 minutes in the furnace at a temperature varying between about 800° C. and about 1000° C., after which the covered crucible was removed from the furnace and allowed to reach room temperature by cooling in air. After cooling, the reaction product mixture was comminuted to produce particles that were substantially all less than about 20 mesh. The comminuted particles were blended with about 76 parts of an aqueous solution of nitric acid containing about 70% $HNO_3$ to form a semiplastic mass which was granulated by tumbling, the resulting granules being heated to remove substantially all of the moisture present. Chemical analysis of the dried granules is as follows:

| Ingredient: | Percent |
| --- | --- |
| Total $P_2O_5$ | 6.67 |
| Available $P_2O_5$ | 5.65 |
| $K_2O$ | 13.46 |
| N | 9.96 |

The availability of the $P_2O_5$ constituent of this material was about 85% of the total $P_2O_5$ as determined in accordance with the procedure set forth in Official and Tentative Methods of Analysis of the Association of Official Agricultural Chemists, Sixth Edition, 1945, pages 21 to 25.

*Example 2*

About 25 parts of the phosphate rock concentrate described in Example 1 and about 10 parts of uncalcined petroleum coke were mixed with about 25 parts of potassium sulfate (about 95% $K_2SO_4$). The mixture was placed in a crucible, which was covered, and heated as in Example 1. Chemical analysis of the furnace product was as follows:

| Ingredient: | Percent |
| --- | --- |
| Total $P_2O_5$ | 21.98 |
| Available $P_2O_5$ | 19.52 |

The furnace product may be further treated with nitric acid as in Example 1 to prepare the novel granular fertilizer.

Having thus fully described and illustrated the invention, what is desired to be secured by Letters Patent is:

1. A method of preparing a granular mixed fertilizer which comprises admixing essentially phosphate rock, a carbonaceous material, and a potassium sulfate-bearing material, fusing the mixture at a temperature between about 750° C. and about 1000° C. in a reducing atmosphere to produce a mixture containing potassium sulfide, whereby a reaction product mixture which is at least partially fused and which contains potassium sulfide is produced, solidifying the reaction product mixture by cooling, reacting said mixture with aqueous nitric acid, whereby phosphate compounds contained therein are stabilized in plant available form, and granulating the resultant reacted mixture.

2. The method of claim 1 wherein the mixture of phosphate rock, carbonaceous material, and potassium sulfate-bearing material contains phosphate rock and potassium sulfate-bearing material in an amount equivalent to a $K_2O$ to $P_2O_5$ molar ratio of between about 1:1 and about 3:1.

3. The method of claim 1 wherein the mixture of phosphate rock, carbonaceous material, and potassium sulfate-bearing material contains carbon in an amount between about 10% and about 35% by weight of potassium sulfate-bearing material in the mixture.

4. The method of claim 1 wherein the potassium sulfate-bearing material consists essentially of potassium sulfate.

5. The method of claim 1 wherein the potassium sulfate-bearing material consists essentially of langbeinite.

6. The method of claim 1 wherein the reaction product mixture is reacted with aqueous nitric acid containing between about 50% and 75% $HNO_3$ by weight.

7. The method of claim 1 wherein the reaction product mixture is reacted with aqueous nitric acid in an amount equivalent to between about 2 moles and about 8 moles of nitric acid per mole of $K_2SO_4$ in the mixture of phosphate rock, carbonaceous material, and potassium sulfate-bearing material prior to heat treatment.

8. A granular mixed fertilizer prepared by admixing essentially phosphate rock, a carbonaceous material and a potassium sulfate-bearing material, fusing the mixture at a temperature between about 750° C. and about 1000° C. in a reducing atmosphere to produce a mixture containing potassium sulfide, whereby a reaction product mixture which is at least partially fused and which contains potassium sulfide is produced, solidifying the reaction product mixture by cooling, reacting said mixture with aqueous nitric acid, whereby phosphate compounds contained therein are stabilized in plant available form, and granulating the resultant reacted mixture.

References Cited in the file of this patent

UNITED STATES PATENTS

| | | |
|---|---|---|
| 1,214,346 | Messerschmitt | Jan. 30, 1917 |
| 2,783,140 | Hignett et al. | Feb. 26, 1957 |

FOREIGN PATENTS

| | | |
|---|---|---|
| 300,961 | Great Britain | Oct. 21, 1929 |